United States Patent [19]

Finelli

[11] 4,016,580
[45] Apr. 5, 1977

[54] FOLDING VIEWFINDING AND FLASH MOUNTING ASSEMBLY

[75] Inventor: Patrick L. Finelli, Sudbury, Mass.

[73] Assignee: Polaroid Corporation, Cambridge, Mass.

[22] Filed: Apr. 21, 1975

[21] Appl. No.: 569,750

[52] U.S. Cl. .............................. 354/126; 350/252; 354/193; 354/219

[51] Int. Cl.² ................. G03B 15/03; G03B 13/06

[58] Field of Search .......... 350/257, 250, 251, 252, 350/245, 247; 354/223, 224, 225, 219, 193, 188, 158, 126, 187; 240/1.3

[56] References Cited

UNITED STATES PATENTS

| 1,684,531 | 9/1928 | Bornmann | 354/223 |
|---|---|---|---|
| 2,756,633 | 7/1956 | Brandes et al. | 350/257 X |
| 3,049,970 | 8/1962 | Steinberg | 350/257 X |
| 3,589,253 | 6/1971 | Erlichman | 354/187 X |
| 3,670,639 | 6/1972 | Hainder, Jr. | 240/1.3 |
| 3,710,697 | 1/1973 | Fraser et al. | 354/188 |

FOREIGN PATENTS OR APPLICATIONS 67,380  8/1948  Denmark ........................... 350/252

OTHER PUBLICATIONS

B383,465, Ellin, Jan. 1975, 240/1.3 R.

Primary Examiner—Edna M. O'Connor
Attorney, Agent, or Firm—John W. Ericson; John S. Vale

[57] ABSTRACT

A folding Galilean viewfinder comprising a cap, an eye lens, an objective lens, a base member, a spring biased linkage connecting the parts together for movement between erected and folded positions, a flash receptacle in the cap, and flexible wiring connected to the receptacle for connecting the receptacle to camera circuits, there being a coupling clip in the linkage which can be installed as the last step in the assembly of the viewfinder. The objective lens may be attached through the use of the coupling clip.

7 Claims, 9 Drawing Figures

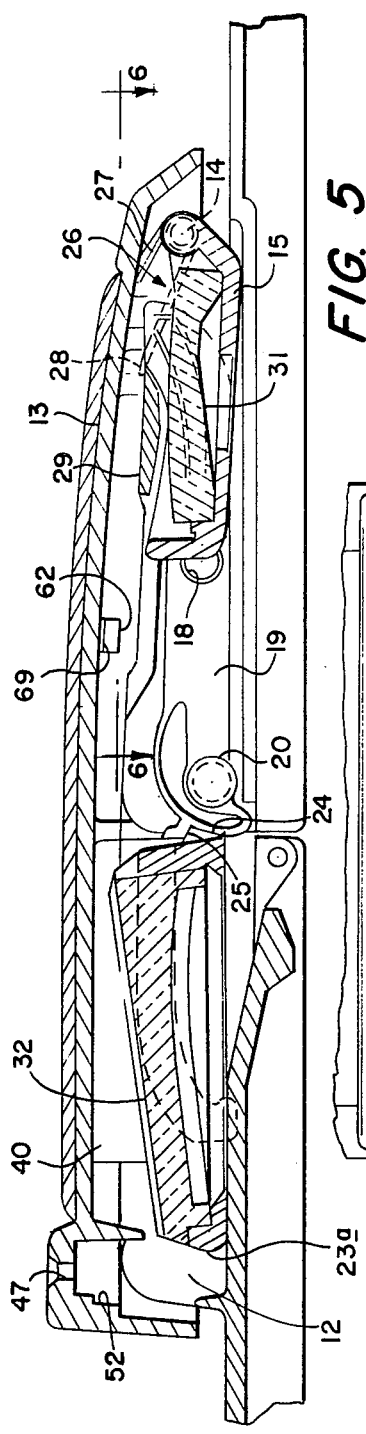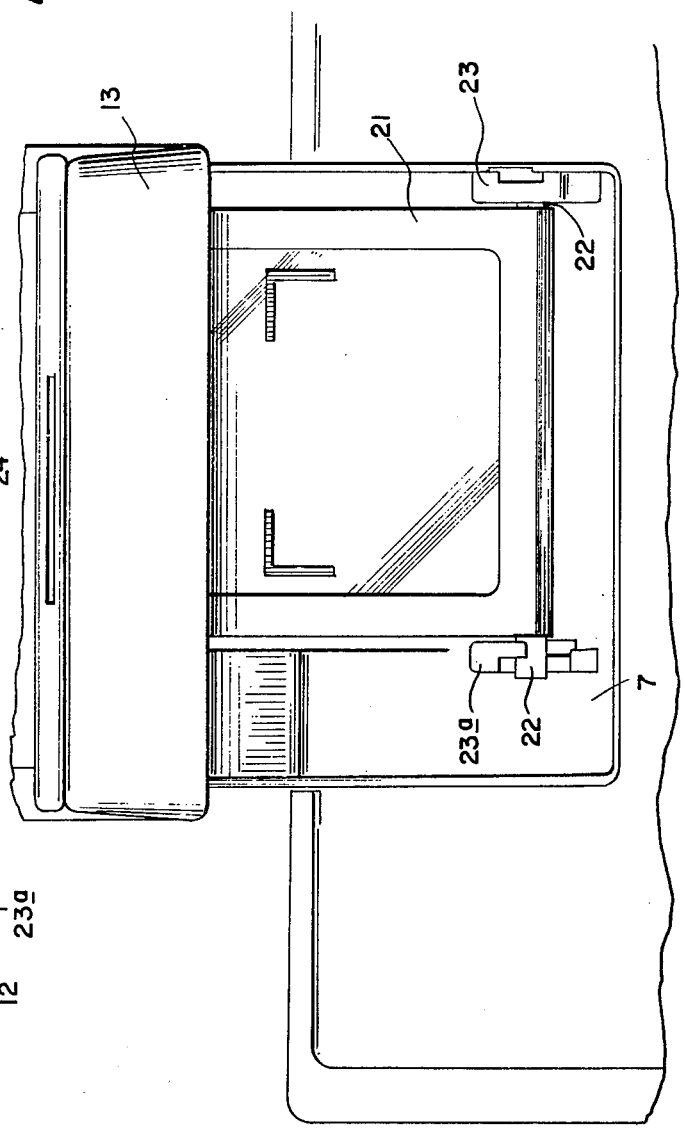

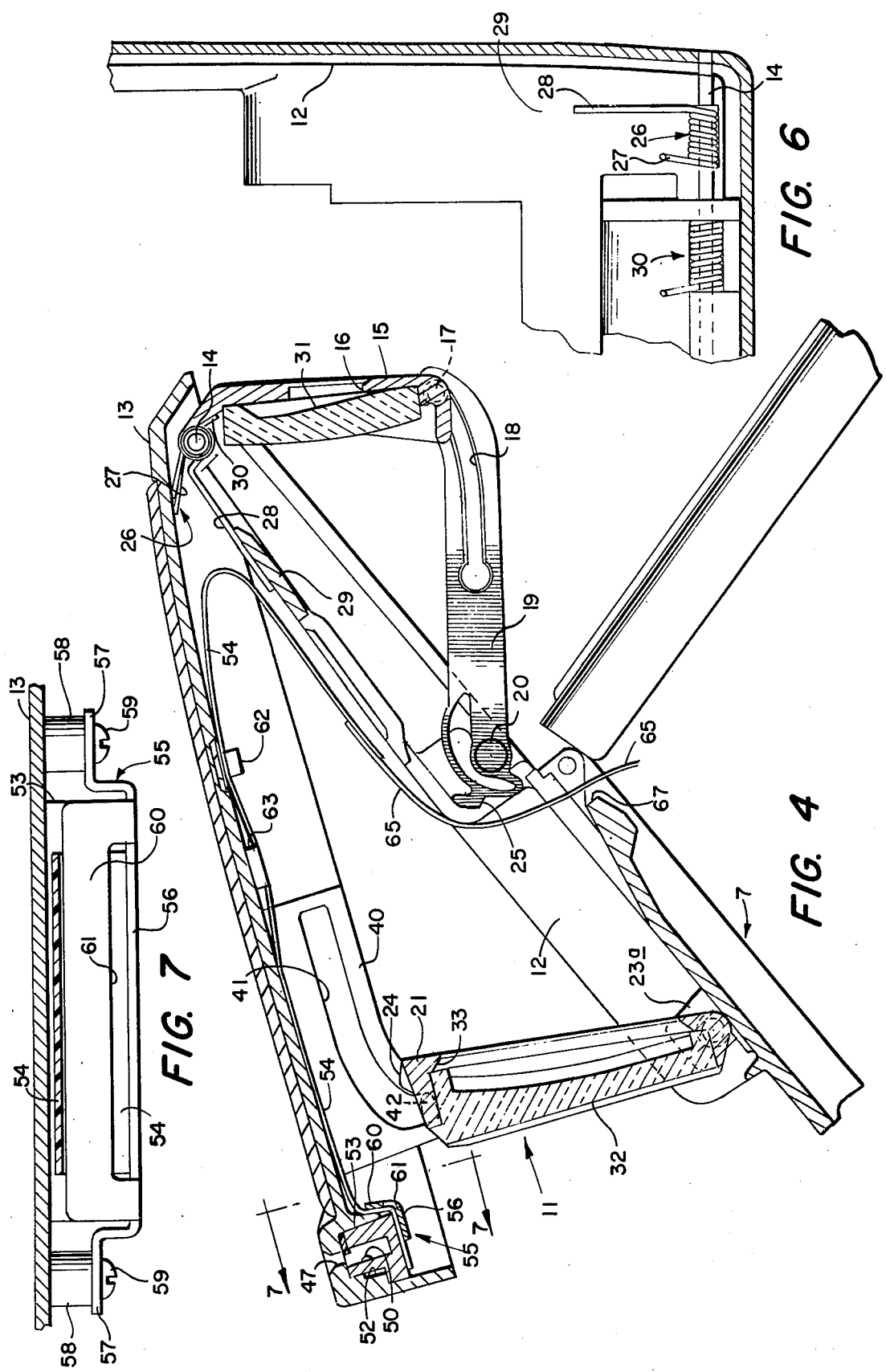

FOLDING VIEWFINDING AND FLASH MOUNTING ASSEMBLY

This invention relates to photography, and particularly to a novel folding viewfinder incorporating a flash mounting socket.

The Polaroid SX-70 Land camera, as manufactured and sold by the Polaroid Corporation of Cambridge, Massachusetts is a highly automatic single lens reflex camera that is adapted to take flash photographs with the aid of flash arrays, such as the flash arrays made and sold by the General Electric Company. Such flash arrays comprise ten flashlamps, in two banks of five, formed with a blade for connection to a socket in the camera lensboard and shutter housing. Sequencing circuits in the camera select one flash bulb in the forward facing bank at a time for energization when the shutter button is pressed to take a flash photograph. Suitable apparatus for this purpose, and the general nature of the camera, the flash array, and the control circuits therefor, are shown, for example, in U.S. Pat. No. 3,820,128, granted on Jun. 25, 1974 to John P. Burgarella, Peter C. Carcia and Richard C. Kee for Flash Photographic Control System and assigned to the assignee of this application.

The models of the Polaroid SX-70 Land camera currently made and sold include a through-the-lens viewing system comprising a folding viewfinder including an eye lens and a concave mirror. In the erect position of the viewfinder, this eyepiece magnifies a real aerial image of the scene to be photographed.

The aerial image is formed by a concave mirror communicating optically with the camera's objective lens through an entrance pupil on the top of the camera by way of an intermediate mirror. The intermediate mirror is formed on a reflex member that is movably mounted in the camera for movement between a viewing position and a taking position. This viewing system is more fully shown and described in U.S. Pat. No. 3,722,389, issued on Mar. 27, 1973, to Peter F. Costa and Edward H. Coughlin for Folding Camera and assigned to the assignee of this application.

It has been proposed to produce a simplified version of the Polaroid SX-70 Land camera in which the through-the-lens viewing system is replaced by a folding Galilean viewfinder, in essentially the same position as the through-the-lens viewfinder. Because such a viewfinder could not be used with the flash array mounted on top of the lensboard and shutter housing, it has been proposed to locate the flash socket on top of the viewfinder cap.

This general location for a flash unit is shown and described, for example, in U.S. Pat. No. 3,589,253, issued on Jun. 29, 1971 to Irving Erlichman for Folding Camera and assigned to the assignee of this application. However, the construction and assembly of a folding viewfinder with a flash socket presents difficulties. If the wiring of the socket to the camera is completed, the connections interfere with the mechanical assembly of the optical parts. On the other hand, once the mechanical assembly is completed, it is quite difficult to complete the wiring.

The principal objects of this invention to simplify the construction and to facilitate the assembly and wiring of a folding viewfinder incorporating a flash socket.

Briefly, the above and other objects of the invention are obtained by a novel folding viewfinder and flash mounting assembly which can be fully wired while only partly assembled, and then finally assembled by simply installing a coupling clip. Basically, a viewfinder in accordance with the invention comprises a base member adapted to form a portion of the housing of the camera on which the viewfinder is to be installed. A viewfinder cap is pivoted at its rear end to a pair of arms extending from the base member, and an eyepiece is hinged to the arms at one end on the same axis as the cap. The other end of the eyepiece is coupled to the arms at a point intermediate their ends by a collapsible linkage. A pair of springs on the hinge axis just described urge the parts toward an erected position. An objective lens assembly is slidably mounted on the cap at its upper end, and adapted to be pivotally mounted on the base member at its lower end. A flash socket is formed in the forward end of the cap, and a connector plug in the socket is electrically connected to a flexible conductor strip that is adapted to be soldered to a corresponding strip in the camera when the unit is installed. The arrangement is such that the parts just described can be assembled, and the base member attached to the camera, before the objective lens assembly is attached to the base member. The flexible conductor strip is then soldered to the camera's mating strip, with the cap held back by the erecting spring to expose the wiring. The assembly is then completed by bringing the cap and its attached objective lens assembly into position for inserting a pair of pivot pins formed on the lower ends of the sides of the objective lens assembly into recesses formed in a pair of posts on either side of the base member. One of the recesses is simply a round hole through the posts; the recess in the other part is an open slot to permit the insertion of the pivot pins by twisting the objective lens assembly, a movement facilitated by the sliding mount to the cap, as will appear. The installation process is then completed by bending a retainer clip over the post with the open slot.

The apparatus of the invention, and its mode of operation, will best be understood in the light of the following detailed description, together with the accompanying drawings, of an illustrative embodiment thereof.

In the drawings,

FIG. 3 is a schematic front elevation of a fragment of the camera and viewfinder of FIG. 1, taken essentially along the lines 3–3 in FIG. 1, with parts broken away;

FIG. 4 is a schematic elevational sketch of the viewfinder of FIG. 1, on an enlarged scale, with parts shown in cross section and parts broken away, taken essentially along the lines 4—4 in FIG. 1;

FIG. 5 is a view corresponding to FIG. 4, but showing the viewfinder in its collapsed position, with parts shown in cross section and parts omitted;

FIG. 6 is a fragmentary schematic plan view of a portion of the viewfinder of FIGS. 1—3, with parts shown in cross section, parts omitted and parts broken away, and taken substantially along the lines 6—6 in FIG. 5;

FIG. 7 is a schematic view, on an enlarged scale, of a socket forming a portion of the apparatus of FIG. 4, taken substantially along the lines 7—7 in FIG. 4, with parts shown in cross section and parts broken away;

Figure 1:
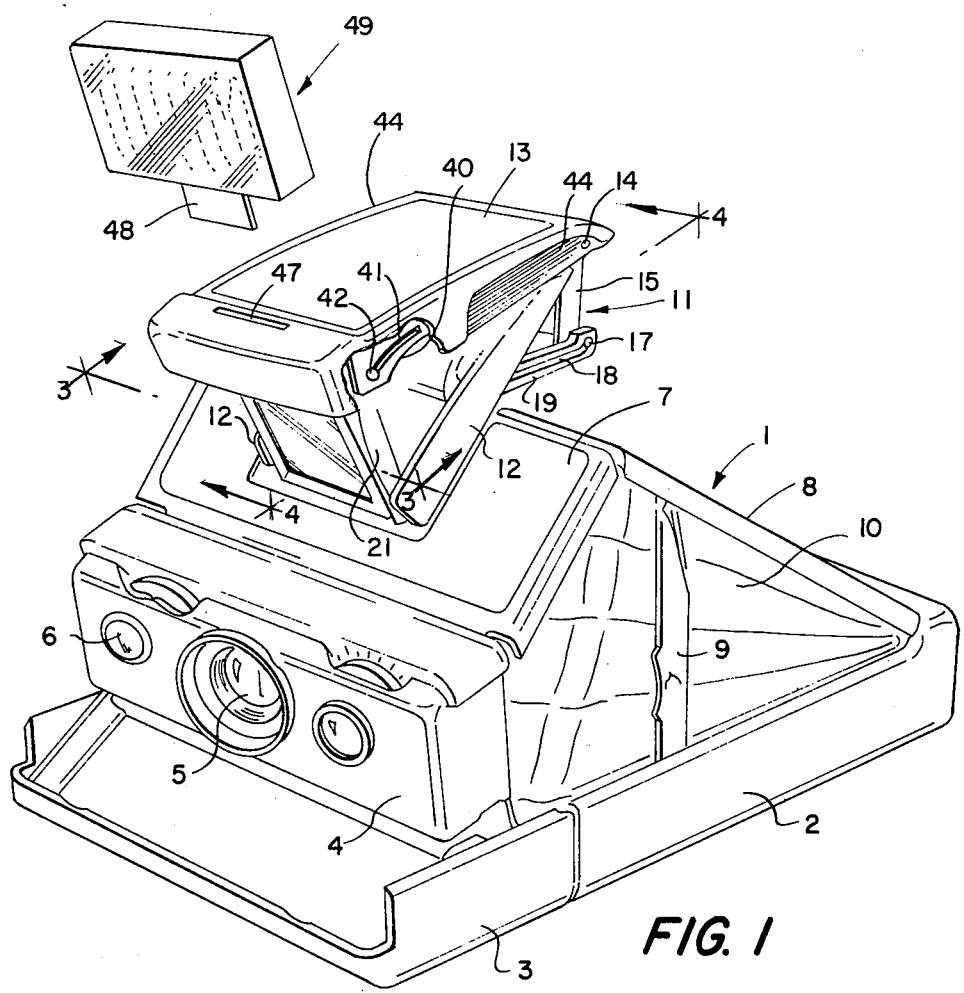
FIG. 1 is a schematic perspective sketch, comprising a three-quarter front view of a camera and flash array, in which the camera incorporates a folding viewfinder and flash mounting assembly in accordance with the invention.

Referring first to FIG. 1, there is illustrated a camera 1, which may be a Polaroid SX-70 Land camera modified in the respects to be described, or any other suitable camera requiring a spring-erected viewing device with the optical and mechanical characteristics to be described. The camera has been shown only very generally, as it is of a well known, commercially available variety, and is well described elsewhere in the patent and other literature.

As suggested in FIG. 1, the camera 1 is of the folding variety comprising a main housing portion 2 hinged at the front to a bed 3 which can be dropped to facilitate loading the camera. A lensboard and shutter housing 4 is provided which may be identical with that of the Polaroid SX-70 Land camera except that it requires no flash bar socket. The taking lens of the camera is indicated at 5, and the shutter button at 6. The top front cover panel 7 is hinged at its forward end to the lensboard and shutter housing 4, and at its rear end to a rear top cover panel 8. The cover panel 8 is hinged to the main housing 2.

The camera is held in its erected position shown by means of an erecting link 9. When in the erected condition shown, a lighttight exposure chamber is formed between the elements just described, the camera's shutter, not shown, and a bellows 10, of flexible lighttight material. The camera so far described may be of any conventional design, but for example can be made from a Polaroid SX-70 Land camera by simply covering the exit pupil in the top cover panel 7 that was provided to communicate with the through-the-lens viewing system.

In place of that viewing system, there is shown a folding Galilean viewfinder generally designated 11.

Referring to FIG. 1, the viewfinder 11 is preferably made in the folding configuration generally similar to that shown in the above-cited U.S. Pat. No. 3,710,697. In particular, formed integrally with the forward top panel 7 are a pair of outstanding arms 12. A viewfinder cap 13 is pivotally mounted to the rear ends of the arms 12, by a pin suggested at 14 in FIGS. 1, 2, 4 and 6.

Figure 2:
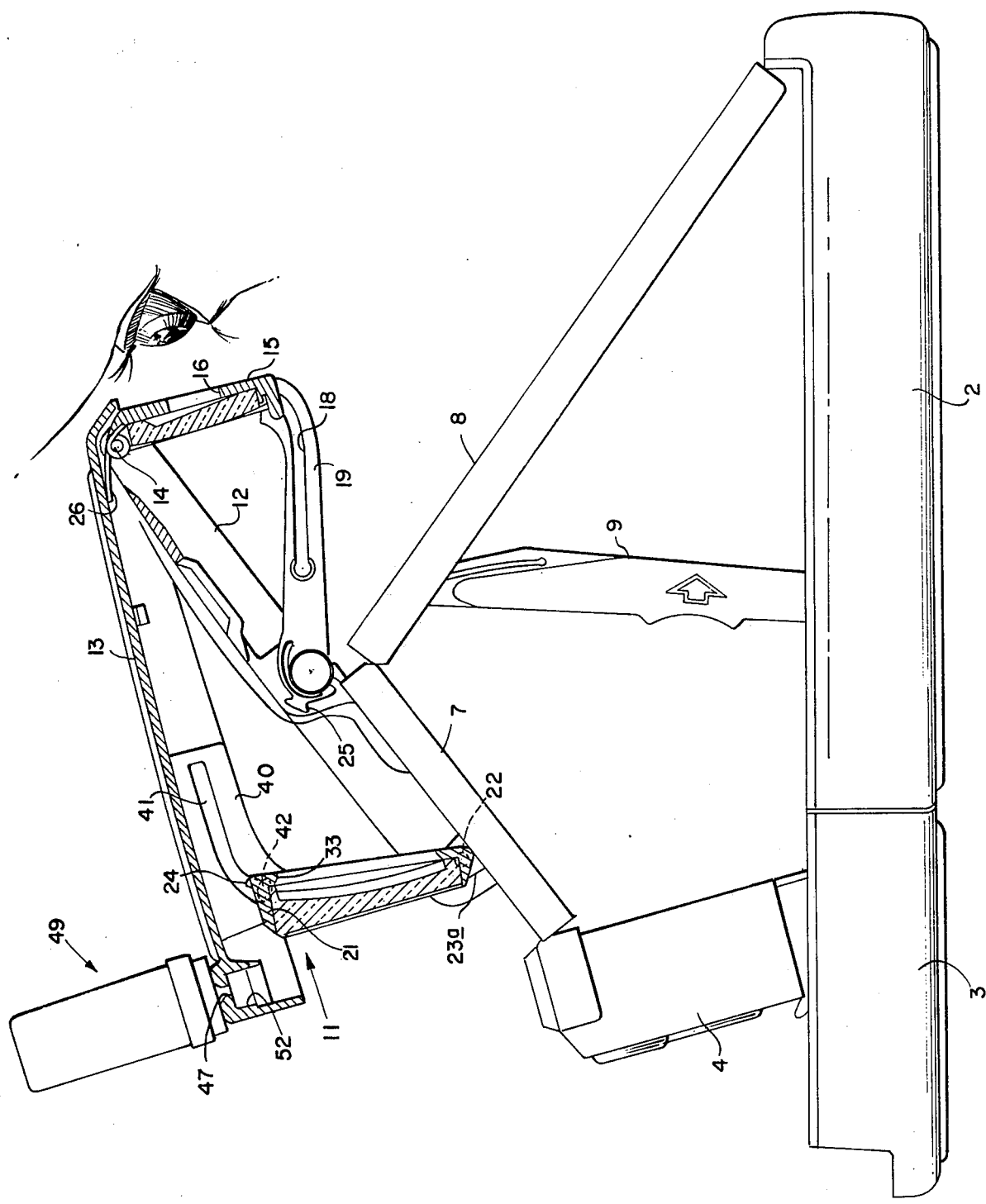
FIG. 2 is a schematic elevational of the camera and viewfinder of FIG. 1, with parts shown in cross section, parts omitted, and on an enlarged scale.

The pin 14, on which the viewfinder cap is hinged to the arms 12, also serves to rotatably support an eye lens housing 15 formed with a rectangular viewing aperture 16 as seen in FIGS. 2 and 4. Comparing FIGS. 1 and 2, the eye lens housing 15 is formed with posts 17 at its lowest corners which are received in guide slots 18 formed in arms 19 that are pivoted to the arms 12 as suggested at 20.

A generally rectangular objective lens housing 21 is formed with pins 22 at its lower corners which are pivoted in posts such as 23 and 23a formed integral with the panel 7. As indicated in FIGS. 2, 4 and 5, the objective lens housing 21 may be provided with a projecting corner 24 on one side at the top for cooperation with a latch member 25 formed on one of the arms 19 to latch the viewfinder in its folded position.

As shown in FIGS. 2, 4, 5 and 6, the viewfinder 11 is urged towards its erected position by a first spring 26 wound around the pin 14. The spring 26 has one end 27 engaging the viewfinder cap 13 and another end 28 engaging a lateral extension 29 formed integral with and bridging the arms 12, as shown in FIGS. 4 and 6.

The eyepiece is urged towards its erected position, as shown in FIGS. 4 and 6, by a corresponding second spring 30, also wound about the pin 14, and acting between the eye lens housing 15 and the viewfinder cap 13.

An eye lens 31, comprising the positive element of a reversed Galilean system, is mounted in the eye lens housing 15. Similarly, an objective lens 32, comprising the negative element of a reversed Galilean system, is mounted in the objective lens housing 21. The details of these lenses form no part of this invention, and may be conventional. However, the particular form shown is desirable for its compactness, and is more fully described in U.S. Application for Pat. Ser. No. 569,763, filed concurrently with this application by William T. Plummer for Compact Galilean Viewfinder and assigned to the assignee of this application.

A rectangular aperture 33 in the objective lens housing 21 defines a mask which is seen somewhat out of focus, as the frame of the scene to be photographed. As is known, the degree of blur in the frame of a Galilean Viewfinder is inversely proportional to the length of the viewfinder.

As indicated in FIGS. 1, 2, 4 and 8, a pair of downwardly dependent ears 40 formed with guide slots 41 are formed integral with the viewfinder cap 13, and guidingly receive posts such as 42 formed on the upper sides of the objective lens housing 21. These posts 42 stop the viewfinder cap in its erected position as shown in FIGS. 2 and 4.

Figure 8:
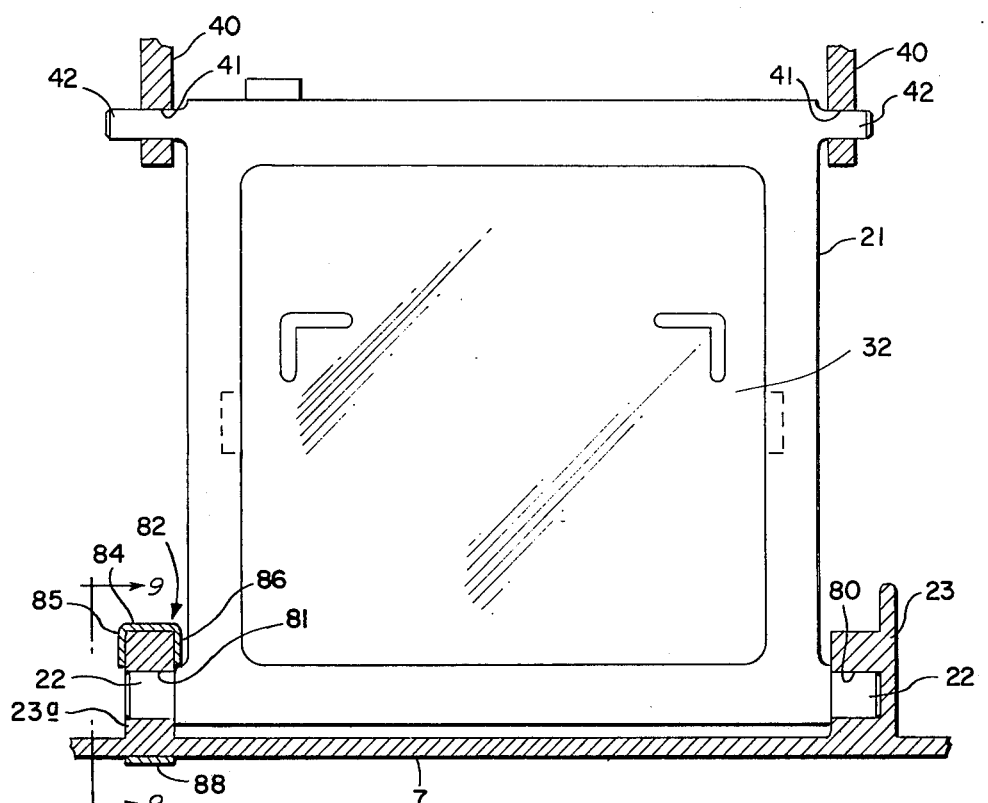
FIG. 8 is a schematic fragmentary diagramatic plan sketch on an enlarged scale, with parts shown in cross section and parts broken away, illustrating the manner of mounting the objective lens assembly in the apparatus of FIGS. 1–5.
Figure 9:
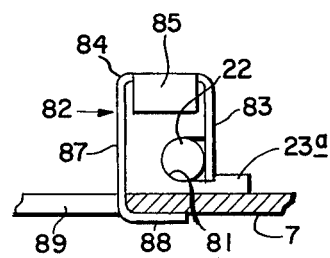
FIG. 9 is a schematic plan view, on an enlarged scale, showing a portion of the apparatus of FIG. 8, taken substantially along the lines 9—9 in FIG. 8, with parts omitted, parts shown in cross section, and parts schematically shown.

Comparing FIGS. 3, 8 and 9, one of the posts 23 that receive the pins 22 formed on objective lens housing 21 is formed with a bore 80 to guide the housing 21 for rotation about the axis of the bore 80. The post 23a on the other side has a corresponding open slot 81 into which the other pin 22 can be inserted, upon a slight twisting movement of the objective lens housing 21 that is permitted by the lost motion of the pins 42 in the guide slots 41, after the pin 14 is installed to pivot the eyepiece and the viewfinder cap to the arms 12 on the base member 7. Once so inserted, the installation of the objective lens assembly is completed by installing a coupling clip, generally designated 82, and best shown in FIGS. 8 and 9.

The coupling clip 82 comprises a metal strip preformed with a front tab 83 to cover the open face of the slot 81 and thereby engage the pin 22. The tab 83 extends to a cap portion 84 formed integral with side gripping tabs 85 and 86. The cap portion 84 is formed integral with a back panel 87 that extends to a bottom tab 88.

The bottom tab 88 is initially a simple extension of the back panel 87. In the installation process, the objective lens housing is placed in the position shown in FIG. 8, whereupon the clip 82 is installed over the post 23a with the tab 88, initially an extension of the panel 87, extending down through a suitable slot 89 formed in the base member 7. The tab 88 is then bent normal to the back panel 87, as shown in FIGS. 8 and 9, so that the parts of the viewfinder are then captured for their intended movements between collapsed and erected positions.

It will be apparent that by the arrangement so far described, when the viewfinder is folded to the position shown in FIG. 5, it is there held by the latch elements 24 on the objective lens housing 21 and 25 on the selected arm 19. The viewfinder may be erected by grasping the viewfinder cap at its rear sides, as indicated at 44 in FIG. 1, and raising it to release the detent catch 25, 24. The viewfinder will then come up into the position shown in FIGS. 2 and 4 under the influence of the spring 27.

As suggested in FIG. 1, the upper side of the viewfinder cap 13 is provided at its forward end with a slot 47 defining the entrance of a socket adapted to receive the blade 48 of a conventional flash array 49. The flash array 49 may be of the conventional variety having five flashlamps on each side, and seven terminals (not shown) on each side of the blade 48. One of these seven terminals is a wide terminal adapted to bridge two contacts in the camera socket and thereby convert the camera to a flash mode of operation. Another of the seven terminals is a common power supply terminal, and the remaining five are selectively energized at times by a conventional flash firing circuit to select one of the flashlamps in the array for firing.

Comparing FIGS. 2, 4 and 5, the slot 47 communicates with a socket generally designated 52 and molded into or otherwise formed integrally with the viewfinder cap 13. A set of eight contacts 50 are mounted on a suitable conventional molded plug 53, of plastic or the like, which fits into the socket 52 and which holds the contacts 50 in spaced insulated relationship. The plug 53 may be molded of any convenient plastic or the like.

Referring to FIGS. 4 and 7, the contacts 50 are connected to control circuits in the camera over a conventional flexible conductor strip 54, which comprises any convenient insulating plastic or the like, in which there is embedded a series of flat copper conducting strips, not shown. The conductor strip 54 is led up over the plug 53 by a retainer clip 55, shown in FIGS. 4 and 7. The retainer clip 55 comprises a top flange portion 56 bent over at the ends to form ears 57 that are secured to suitable posts 58 molded integral with the viewfinder cap 13 by means such as a pair of screws 59. The clip 55 is folded over as shown at 60 and relieved with a slot as indicated at 61 to allow the flexible conductor strip 54 to be bent at a more gradual radius.

As indicated in FIG. 4, the strip 54 passes up against the top of the viewfinder cap 13, where it is retained by means such as posts 62, formed integral with the viewfinder cap on either side of the strip 54. The posts 62 are formed with slots 69 (FIG. 5) to receive the edges of the flexible strip 54.

Between the posts 62 and the clip 55, there is preferably located the flash firing circuit for the camera comprising an integrated circuit indicated at 63. This may be the flash firing circuit used in the Polaroid SX-70 Land camera, or any other suitable switching apparatus for selectively firing each of the five bulbs in the flashlamps in one side of an array. Basically, in practice it would comprise five silicon controlled rectifiers and control circuits for selectively using each of these controlled rectifiers as a switch for firing a different one of the flashlamps. Its location near the socket is necessary to avoid multiple firing, for reasons which are beyond the scope of this description; for present purposes, it is only desired to point out that the attempt to carry this portion of the circuit down into the camera would result in difficulties.

The flexible conductor strip 54 passes to the rear of the viewfinder cap 13, and then downwardly to a junction with a corresponding strip 65, to which its several leads can be soldered in a conventional manner. Location of a soldered junction here facilitates manufacture of the apparatus, before the installation of the coupling clip 82, but after the other parts have been assembled in the relation shown, as described above.

The conductor strip 65 passes down into communication with the camera control circuits, not shown, through an aperture 67 in the top panel 7 which is light-shielded from the exposure chamber described above.

While the invention has been described with reference to the details of a particular embodiment thereof, many changes and variations will occur to those skilled in the art upon reading this description, and such can obviously be made without departing from the scope of the invention.

Having thus described the invention, what is claimed is:

1. A viewfinder and flash mounting assembly capable of being readily mounted on a camera during the construction thereof and comprising, in combination, a base member adapted to form a portion of the housing of the camera, a pair of spaced parallel arms formed integrally with and extending from said base member, a viewfinder cap, an eye lens assembly, means pivotally mounting ends of said cap and said eye lens assembly to ends of said arms for rotation about a common first axis, means guidingly coupling said eye lens assembly to an intermediate portion of said arms for movement between erect and collapsed positions, spring means acting between said cap and said base member for urging said cap toward an erect position, means forming a flash receptacle in said cap at an end remote from said first axis, a flexible connector cable joined to said receptacle and adapted to be connected to a corresponding cable in the camera, an objective lens assembly, means mounting said objective lens assembly on said cap at an end thereof adjacent said receptacle for guided movement between an erect and a collapsed position, and means for pivotally mounting said objective lens assembly on said base member comprising a pair of pivot pins formed integral with said objective lens assembly, a pair of posts formed integral with said base member, and a coupling clip, one of said posts being formed with a recess adapted to receive and constrain one of said pins for rotation about a second axis, the other of said pins being formed with an open slot adapted to receive the other of said pins, and said coupling clip comprising means adapted to be fastened over said post and cover said slot after said pin is in place to constrain said pin for rotation about said second axis.

2. The method of assembling a folding viewfinder and flash mounting assembly, comprising the steps of pivotally mounting a viewfinder cap and eye lens assembly to a pair of arms extending from a base member formed with a slot adapted to receive a flexible cable connector, pivotally mounting an objective lens assembly to the other end of said viewfinder cap, electrically connecting a flexible cable having one end connected to a receptacle in said cap to a corresponding camera's cable extended up through said slot, and then pivotally connecting said objective lens assembly to said base member.

3. A folding viewfinder and flash mounting assembly, comprising a base member, a cap member, means pivotally mounting said cap member on said base member, means forming an electrical receptacle adapted to receive a flash array, flexible electrical connector means connected at one end to said receptacle and extending to a second end adapted to be soldered to a corresponding connector means for electrically connecting said receptacle to a camera, a lens assembly, means mounting said lens assembly on said cap member for limited rotation and translation relative to said cap member, means forming first and second spaced mounting posts on said base member, a pair of spaced pivot pins fixed on said lens assembly along colinear axes and spaced to bridge said posts, a recess formed in a first of said posts and adapted to receive one of said pins, means forming a slot in the second of said posts adapted to receive the other of said pins, and a coupling clip adapted to be mounted over said second post when said pins are inserted in said recess and said slot for closing said slot and thereby capturing said lens assembly for rotation relative to said base member about said axes.

4. The method of claim 2 wherein said step of pivotally connecting said objective lens assembly to said base member includes locating a pivot pin on said lens assembly in an open slot formed in a mounting post on said base member and installing a coupling clip over said mounting post to cover said slot thereby capturing said pivot pin.

5. A folding viewfinder comprising: a base member, a cap member, means pivotally mounting said cap member on said base member, a lens assembly, means mounting said lens assembly on said cap member for limited rotation and translation relative to said cap member, means forming first and second spaced mounting posts on said base member, a pair of spaced pivot pins fixed on said lens assembly along colinear axes and spaced to bridge said mounting posts, a recess formed in said first mounting post and adapted to receive one of said pivot pins, means forming a slot in said second mounting post adapted to receive the other of said pivot pins, and a coupling clip adapted to be mounted over said second mounting post when said pivot pins are inserted in said recess and said slot for closing said slot and thereby capturing said lens assembly for rotation relative to said base member about said axes.

6. A folding viewfinder as defined in claim 5 wherein said coupling clip includes a portion thereof that is adapted to be deformed after said coupling clip is positioned over said second mounting post and slot for engaging said base member to secure said coupling clip thereto.

7. A folding viewfinder as defined in claim 5 wherein said mounting posts are formed on one side of said base member and said base member further includes a slot therein adjacent said second mounting post and extending through said base member to a side thereof opposite said one side and said coupling clip includes a tab thereon adapted initially to extend through said base member slot and beyond said opposite side when said coupling clip is mounted over said second mounting post and thereafter being adapted to be bent over into engagement with said opposite side of said base member for securing said coupling clip to said base member.

* * * * *